US009280465B2

(12) United States Patent
Guthrie et al.

(10) Patent No.: US 9,280,465 B2
(45) Date of Patent: *Mar. 8, 2016

(54) TECHNIQUES FOR MOVING CHECKPOINT-BASED HIGH-AVAILABILITY LOG AND DATA DIRECTLY FROM A PRODUCER CACHE TO A CONSUMER CACHE (71) Applicant: GLOBALFOUNDRIES INC., Grand Cayman (KY)

(72) Inventors: Guy Lynn Guthrie, Austin, TX (US); Steven R. Kunkel, Rochester, MN (US); Hien Minh Le, Cedar Park, TX (US); Geraint North, Manchester (GB); William J. Starke, Round Rock, TX (US)

(73) Assignee: GLOBALFOUNDRIES INC., Grand Cayman (KY)

( * ) Notice: Subject to any disclaimer, the term of this patent is extended or adjusted under 35 U.S.C. 154(b) by 149 days.

This patent is subject to a terminal disclaimer.

(21) Appl. No.: 14/048,474

(22) Filed: Oct. 8, 2013

(65) Prior Publication Data

US 2015/0100731 A1  Apr. 9, 2015

(51) Int. Cl.
*G06F 12/08*  (2006.01)
*G06F 12/12*  (2006.01)
*G06F 11/14*  (2006.01)
*G06F 11/16*  (2006.01)
(Continued)

(52) U.S. Cl.
CPC ........ *G06F 12/0802* (2013.01); *G06F 11/1446* (2013.01); *G06F 11/1666* (2013.01); *G06F 11/2097* (2013.01); *G06F 12/0888* (2013.01); *G06F 12/12* (2013.01); *G06F 11/1076* (2013.01); *G06F 12/0815* (2013.01); *G06F 2212/1016* (2013.01); *G06F 2212/152* (2013.01)

(58) Field of Classification Search
CPC ............ G06F 12/0888; G06F 12/0811; G06F 12/0853; G06F 12/0802; G06F 12/0815; G06F 12/12; G06F 11/1446; G06F 11/1666
USPC .................................................. 711/122, 133
See application file for complete search history.

(56) References Cited

U.S. PATENT DOCUMENTS 7,200,620 B2 * 4/2007 Gupta ..................... 707/999.201
8,140,739 B2 * 3/2012 Langlois et al. ............... 711/103
(Continued)

FOREIGN PATENT DOCUMENTS

EP  2 259 525 A2  8/2010

OTHER PUBLICATIONS

Milenkovic et al., Cache Injection on Bus Based Multiprocessors, University of Belgrade, 1999.

*Primary Examiner* — Pierre-Michel Bataille
(74) *Attorney, Agent, or Firm* — Thompson Hine LLP (57) ABSTRACT

A technique of operating a data processing system, includes logging addresses for cache lines modified by a producer core in a data array of a producer cache to create a high-availability (HA) log for the producer core. The technique also includes moving the HA log directly from the producer cache to a consumer cache of a consumer core and moving HA data associated with the addresses of the HA log directly from the producer cache to the consumer cache. The HA log corresponds to a cache line that includes multiple of the addresses. Finally, the technique includes processing, by the consumer core, the HA log and the HA data for the data processing system.

15 Claims, 5 Drawing Sheets

(51) Int. Cl.
  *G06F 11/20* (2006.01)
  *G06F 11/10* (2006.01)

(56) References Cited

U.S. PATENT DOCUMENTS

| | | |
|---|---|---|
| 8,285,939 B2 | 10/2012 | Guthrie et al. |
| 8,312,220 B2 | 11/2012 | Guthrie et al. |
| 8,347,036 B2 | 1/2013 | Cargnoni et al. |
| 8,863,224 B2 * | 10/2014 | Hecht et al. .................... 713/165 |
| 8,874,841 B2 * | 10/2014 | Patterson et al. ............. 711/114 |
| 2005/0071391 A1 * | 3/2005 | Fuerderer et al. ............. 707/204 |
| 2006/0064518 A1 | 3/2006 | Bohrer et al. |
| 2010/0241813 A1 | 9/2010 | Shen |
| 2014/0101110 A1 * | 4/2014 | Rittle et al. ................... 707/654 |
| 2014/0289449 A1 * | 9/2014 | Ogata ........................... 711/103 |

\* cited by examiner

TECHNIQUES FOR MOVING CHECKPOINT-BASED HIGH-AVAILABILITY LOG AND DATA DIRECTLY FROM A PRODUCER CACHE TO A CONSUMER CACHE

BACKGROUND

The disclosure is generally directed to checkpoint-based high-availability log and data and, more particularly, to moving checkpoint-based high-availability log and data directly from a producer cache to a consumer cache.

Computing may be thought of in terms of an application and a supporting platform. A supporting platform typically includes a hardware infrastructure of one or more processor cores, input/output, memory, and fixed storage (the combination of which supports an operating system (OS), which in turn supports one or more applications). Applications may be thought of as self-contained bundles of logic that rely on core object files and related resource files. As computing has become integral to modern industry, applications have become co-dependent on the presence of other applications. That is, a requisite environment for an application includes not only an underlying OS and supporting hardware platform, but also other key applications.

Key applications may include application servers, database management servers, collaboration servers, and communicative logic commonly referred to as middleware. Given the complexity of application and platform interoperability, different combinations of applications executing in a single hardware platform can demonstrate differing degrees of performance and stability. Virtualization technology interjects a layer between a supporting platform and executing applications. From the perspective of business continuity and disaster recovery, virtualization provides the inherent advantage of environment portability. For example, moving an entire environment configured with multiple different applications may be as simple as moving a virtual image from one supporting hardware platform to another.

In general, more powerful computing environments can support the coexistence of multiple different virtual images while maintaining a virtual separation between the images. Consequently, a failure condition in one virtual image typically cannot jeopardize the integrity of other co-executing virtual images in the same hardware platform. A virtual machine monitor (VMM) or hypervisor manages the interaction between each virtual image and underlying resources provided by a hardware platform. A bare metal hypervisor runs directly on the hardware platform similar to how an OS runs directly on hardware. In contrast, a hosted hypervisor runs within a host OS. In either case, a hypervisor can support the operation of different guest OS images or virtual machine (VM) images. The number of VM images is limited only by the processing resources of a VM container that holds the VM images or the hardware platform.

Virtualization has proven especially useful for end-users that require separate computing environments for different types of applications that are deployed on a single hardware platform. For example, a primary OS native to one type of hardware platform may provide a virtualized guest OS that is native to a different hardware platform (so that applications requiring the presence of the guest OS can co-exist with other applications requiring the presence of the primary OS). In this case, an end-user is not required to provide separate computing environments to support different types of applications. That is, irrespective of the guest OS, access to underlying resources of the single hardware platform remains static.

Virtualized environments have been deployed to aggregate different interdependent applications in different VMs in composing application solutions. For example, an application server can execute within one VM while a database management server executes in a different VM and a web server executes in yet another VM. Each of the VMs can be communicatively coupled to one another in a secure network and any given deployment of the applications can be live migrated to a different deployment without interfering with the execution of the other applications in the other VMs. In a typical live migration, a VM can be moved from one host server to another host server in order to, for example, permit server maintenance or to permit an improvement in hardware support for the VM.

Checkpoint-based high-availability (HA) is a technique in which a VM running on a primary host machine mirrors its processor and memory state every period (e.g., 25 mS) onto a secondary host machine. The mirroring process typically includes: tracking changes to the memory and processor state of the primary VM; periodically stopping the primary VM; sending the changes over a network to the secondary host machine; waiting for the secondary host machine to acknowledge receipt of the memory and processor state update; and resuming the primary VM. The mirroring process ensures that the secondary host machine is able to resume the workload with minimal loss of service should the primary host machine suffer a sudden hardware failure. If the secondary host machine either detects that the primary host machine is not responding or receives an explicit notification from the primary host machine, the secondary host machine starts the mirrored version of the VM and the appearance to the outside world is that the VM seamlessly continued to execute across the failure of the primary host machine.

Although the checkpoint-based HA technique provides effective protection against hardware failure, the checkpoint-based HA technique does not protect against software failure. Because the state of the processor and memory of the primary VM is faithfully reproduced on the secondary host machine, if a software crash (for example, the de-reference of a null pointer) causes a failover to the secondary host machine, the VM resumes execution from the last checkpoint and, if the program execution is deterministic, the same error will occur. There are some constrained cases in which a VM may not crash if software failure triggered a failover. However, these cases are rare and rely more on luck than design. For example, a software bug that manifested as a race condition in which one processor could access data that was being modified by another processor might not occur when the workload was resumed on the secondary host machine, as by a fluke of scheduling the data may not end up being concurrently accessed.

BRIEF SUMMARY

A technique of operating a data processing system, includes logging addresses for cache lines modified by a producer core in a data array of a producer cache to create a high-availability (HA) log for the producer core. The technique also includes moving the HA log into a consumer cache of a consumer core and moving HA data associated with the addresses of the HA log into the consumer cache. The HA log corresponds to a cache line that includes multiple of the addresses. Finally, the technique includes processing, by the consumer core, the HA log and the HA data for the data processing system.

The above summary contains simplifications, generalizations and omissions of detail and is not intended as a comprehensive description of the claimed subject matter but, rather, is intended to provide a brief overview of some of the functionality associated therewith. Other systems, methods, functionality, features and advantages of the claimed subject matter will be or will become apparent to one with skill in the art upon examination of the following figures and detailed written description.

The above as well as additional objectives, features, and advantages of the present invention will become apparent in the following detailed written description.

BRIEF DESCRIPTION OF THE DRAWINGS

The description of the illustrative embodiments is to be read in conjunction with the accompanying drawings, wherein.

DETAILED DESCRIPTION

The illustrative embodiments provide a method, a data processing system, and a processor configured to move checkpoint-based high-availability (HA) log and data from a producer cache to a consumer cache.

In the following detailed description of exemplary embodiments of the invention, specific exemplary embodiments in which the invention may be practiced are described in sufficient detail to enable those skilled in the art to practice the invention, and it is to be understood that other embodiments may be utilized and that logical, architectural, programmatic, mechanical, electrical and other changes may be made without departing from the spirit or scope of the present invention. The following detailed description is, therefore, not to be taken in a limiting sense, and the scope of the present invention is defined by the appended claims and equivalents thereof.

It should be understood that the use of specific component, device, and/or parameter names are for example only and not meant to imply any limitations on the invention. The invention may thus be implemented with different nomenclature/ terminology utilized to describe the components/devices/parameters herein, without limitation. Each term utilized herein is to be given its broadest interpretation given the context in which that term is utilized. As used herein, the term 'coupled' may encompass a direct connection between components or elements or an indirect connection between components or elements utilizing one or more intervening components or elements.

As noted above, checkpoint-based high-availability (HA) is a technique in which a virtual machine (VM) running on a 'primary host machine' regularly (e.g., every 25 mS) performs a 'checkpoint' that mirrors a processor and memory state of the primary host machine onto a 'secondary host machine. The mirroring process involves: tracking changes to processor registers and memory of the VM; periodically stopping the VM; sending the tracked changes (e.g., over a network) to the secondary host machine; waiting for the secondary host machine to acknowledge receipt of the processor and memory state update; and resuming the VM. This ensures that the secondary host machine is able to resume the workload with minimal loss of service should the primary host machine experience a sudden hardware failure.

In one or more conventional checkpoint-based HA implementations, a hypervisor identifies modified areas of VM memory using page protection in which all memory is marked read-only after a checkpoint. The hypervisor functions to: detect subsequent faults that occur when a store is first performed to a page of memory; restore original access permissions for the page; and mark the page as 'dirty' requiring transmission of the page at a next checkpoint. In general, a VM employing checkpointing incurs more page protection faults than if checkpointing is not employed. It should be appreciated that a change to a single byte on a page requires the entire page to be transmitted to the secondary system, since once the page protection is removed there is no way to tell how much of the page was modified without using additional processor cycles and additional memory to compare the page against a copy of the original page. As a result of the requirement to send an entire dirty page to a secondary system, conventional systems typically use relatively small page sizes (e.g., 4K page sizes, as contrasted with 64K page sizes) to reduce traffic between primary and secondary systems. In this case, conventional system performance may be adversely affected as an operating system (OS) is not able to utilize large pages.

According to one or more aspects of the present disclosure, modifications to memory may be logged without page faults at a cache line granularity by maintaining a buffer that is populated with addresses of cache lines that have been modified by a producer processor core (producer core) since the last checkpoint. The buffer can be inspected, either during checkpointing or speculatively prior to a checkpoint, in order to determine which cache lines need to be transmitted to the secondary system in order to maintain a consistent memory image. Maintaining the buffer in cache generally reduces page faults and reduces the traffic between primary and secondary systems due to the smaller granularity of modification (i.e., a cache line, rather than a page). The buffer approach is also page-size agnostic and, as such, systems can utilize larger page sizes without incurring page-size related performance penalties.

According to one or more embodiments of the present disclosure, logging a cache line address yields a significant performance advantage and complexity reduction over known approaches. In various embodiments, the disclosed techniques may be implemented in hardware, with some components implemented in cache and some parameters exposed via processor registers that are only accessible to privileged hypervisor code. In one or more embodiments, hypervisor software is modified to take advantage of added hardware features.

Within a cache hierarchy of any modern processor design there exists some form of cast-out engine and snoop-intervention engine. A cast-out engine is responsible for writing data evicted from the cache back to system memory or into a cache associated with another processor. A snoop-intervention engine is responsible for providing data from a given cache to another processor that is trying to gain access to a cache line that includes the data. Operation of the cast-out engine may be triggered by, for example, a requirement to free-up space in a cache for incoming data. Operation of the snoop-intervention engine may be triggered to, for example, provide another processor exclusive access to a cache line in the event that the processor wishes to modify data in the cache line. In general, during a checkpoint interval (i.e., a time between two checkpoints), every cache line modified between checkpoints is either resident as dirty data in a cache or has been through a cast-out or snoop-intervention engine and, at a checkpoint, a cache walk/scrub can be triggered.

A cache flush pushes dirty data out to system memory such that every cache line modified between checkpoints is guaranteed to have been through the cast-out engine. A cast-out engine and snoop-intervention engine may be modified so that, as well as writing dirty cache line data to memory/another cache, the engines can also operate in a mode in which the address of the modified cache line is written to a circular buffer that resides in cache. In order to increase efficiency, cache hardware may be configured to manage an intermediate buffer (e.g., a two cache line deep buffer) that collects an address reported by cast-out and/or snoop-intervention engines. In one or more embodiments, when the intermediate buffer is filled with a full cache line payload of addresses, the cast-out engine (through a cast-out command) moves the contents of the intermediate buffer to the circular buffer. In at least one embodiment, each cache line in the intermediate buffer holds up to sixteen eight-byte addresses.

It should be appreciated that not all processor cores of a data processing system run in a producer mode at all times. A processor core that runs in the producer mode is referred to herein as a 'producer core'. A processor core may be placed into producer mode by setting a hardware flag that is accessible to a hypervisor. In a least one embodiment, when a processor core is in producer core mode, in order to manage writing to the circular buffer the cast-out engine maintains registers containing: a base (which is a pointer to base address of the buffer); a producer head (which is an offset within the buffer to which a next address will be written); a barrier (which is a boundary pointer); and a size (which is an indication of the size of the buffer).

In various embodiments, an HA log is maintained in memory that is separate from memory allocated to a virtual machine (VM) and is only accessible to a hypervisor. When in producer core mode, cast-out and snoop-intervention operations, in addition to the regular cast-out and/or snoop-intervention behavior, are configured to log an address of a modified cache line to a currently-filling intermediate buffer (e.g., using ping-pong buffering so that one buffer can be filled while the other is being written back to another memory) of the cache. When in producer core mode, a cast-out engine may be commanded to move cache lines from the intermediate buffer (as they fill) of the cache to the circular buffer in cache through the following behavior: issue a store of the cache line address to the producer head pointer; increment the producer head pointer, wrapping around to base if the producer head pointer goes to base+size; and if producer head is equal to the barrier, a fault is delivered to the hypervisor.

In various embodiments, when a next checkpoint occurs: the hypervisor on the primary host suspends execution of the VM; a cache walk operation is triggered to generate entries for an HA log; and a consumer core, which may be a physically different core or the same core (but no longer in producer core mode), traverses the HA log and, for each entry, reads the address, reads the current data at the address from the memory of the VM, transmits the (address, data) pair to the secondary host, where it is used to update the memory image of a secondary VM, synchronizes other state (e.g., processor registers) with the secondary system, and then initiates resumption of execution of the primary VM.

A consumer core may implement various optimizations. For example, when a particular address has been cast-out several times in a checkpoint interval, the cast-out address will appear in a log multiple times. It should be appreciated that duplicate cast-out addresses only need to be transmitted to the secondary system once, as it is the current data in the memory of the VM that is transmitted and not the data at the time of cast-out (which is not logged). As such, the consumer core may perform some reduction in order to reduce bandwidth to the secondary system. As above, when the VM utilizes multiple processor cores and the same cache line is cast-out by more than one producer core during the same checkpoint interval, the address will appear in multiple logs but only needs to be transmitted once. Again, some reduction across logs can be performed to reduce bandwidth.

The consumer core may start to speculatively process the HA log of the producer core prior to the checkpoint. While speculatively processing the HA log of the producer core reduces the scope for reduction, speculatively processing the HA log of the producer core smoothes the data transfer to the secondary system and makes more efficient use of the available total bandwidth. It should be noted that the bulk of the working footprint utilized by the primary VM may reside in cache for the duration of time between checkpoints and the bulk of the logging occurs at checkpoint time. The natural caching by the hardware may do an efficient job at only logging a given cache line once even when it has been stored to multiple times between checkpoints. The purpose of the barrier register is to ensure that no data is lost during a checkpoint operation due to a log wrap. The barrier points to the first log record in the checkpoint interval to ensure that data cannot be overwritten, based on the check of the producer head against the barrier.

In various embodiments, if the barrier is reached, then either a failover to the secondary system is initiated or all VM memory is resynchronized. The failover to the secondary system or VM memory resynchronization is desirable as there may be dirty data in the cache that has not yet been through the cast-out engine. In this case, it is not desirable to simply initiate an immediate checkpoint, as there is no where for the dirty addresses to be logged. In general, a hypervisor should both ensure that a log is appropriately sized and also monitor the producer head pointer regularly, initiating an early checkpoint if a log overflow is anticipated. If the consumer core is speculatively processing the log, the hypervisor may periodically move the barrier pointer along so that the overflow is only triggered if the producer core collides with log entries that the consumer core has not already processed (in the event the consumer core falls behind).

Modifications may be implemented that cause a cast-out engine and snoop-intervention engine to log memory addresses leaving the cache between checkpoints and at a checkpoint initiate a cache flush to ensure that no modified data remains in the cache (thereby ensuring that modified data passes through the cast-out engine and is logged). A drawback of this approach is that a cache flush is required at every checkpoint interval. The cache flush results in additional pressure on the cast-out engine and memory subsystem and generally reduces performance of a workload that is running in highly-availability (HA) mode.

According to another approach, all addresses are guaranteed to be logged at a checkpoint interval without requiring a cache flush by introducing a new 'HA bit' for every cache line in a cache. The HA bit is set by a modification of the cache line when a processor core is running in producer core mode and may be cleared as part of a cache walk operation, which is executed at a checkpoint and walks the cache causing cache lines for which the HA bit is asserted to log their addresses to the circular buffer. The HA bit is then de-asserted for all cache lines. In this implementation, the data associated with the cache line is not written to system memory and the cache line is still marked as 'dirty' within the cache. Processor caches are typically implemented as lookup tables that associate an address (tag) with some data. The tag may be a virtual or a physical address, or some combination thereof, and the data is of a fixed size (e.g., a cache line). For any given tag there may be several locations in the cache where the data could be found and, as such, a cache lookup typically involves the inspection of a number of slots to find a matching tag. Additionally, slots may not contain any data and, as such, a slot typically includes not just the data to be associated with the tag, but also multiple flags.

According to another implementation, the HA bit is added to every slot in the cache. The HA bit is asserted when data associated with a cache line is updated by a processor core running in producer core mode. At a checkpoint, a cache walk operation traverses the entire cache, similar to a cache flush, but rather than examining the 'dirty bit' and pushing the data out to system memory, the cache walk operation instead examines the 'HA bit' and pushes the physical address out to the circular buffer.

In most computing systems, it is common to have several layers of cache (e.g., level 1 through level N (i.e., L1 through LN), where L1 represents the fastest, smallest cache that is closest to the processor core and N is typically 3 or 4 and tends to be slower and larger as N increases). In one or more embodiments, a cache walk operation traverse all caches that may contain HA modified data, but this does not necessarily mean that all caches must be traversed as some cache levels may be write-through or write-back. As is known, write-through caches retain data in the cache, but also synchronously push the data back to the next cache level to facilitate fast access times for subsequent reads. Writes for write-through caches are more expensive than in a write-back caches, since a writer must wait for write completion from the (slower) next level cache. Write-through caches do not need to be flushed. Write-back caches retain data in the cache and do not synchronously push the data to the next level in the cache. With write-back caches the process of writing to the cache is faster, at the expense of having to manage data coherency between caches in a symmetric multi-processor (SMP) system. The cost of writing to the next level in the cache is incurred when data is evicted from the cache to make room for additional data.

In a multi-layer cache hierarchy, only the write-back caches need to be traversed by a cache walk operation. For example, in a system that includes a write-through L1 cache, a write-back L2 cache, and a write-back L3 cache, any write performed by a processor will go to the L1 cache and (since it is write-through) also be written to the L2 cache. In this case, there is no dirty data in the L1 cache that is not in the L2 cache. As more space is needed in the L2 cache, dirty data is evicted and becomes dirty data in the L3 cache. In this example, writes performed in producer core mode set the HA bit in the L2 cache for the associated cache line. When a cache line with the HA bit set in the L2 cache is cast-out to the L3 cache, the HA bit in the L3 cache associated with the cache line is set. In this example, the L1 cache does not require HA bits. At a checkpoint, the cache walk operation needs to traverse both the L2 and L3 caches, writing all the physical addresses for cache lines with the HA bit asserted to the circular buffer and clearing all the HA bits once the operation is complete.

The above descriptions describe enhancements to cache hardware to ensure that at regular intervals a circular buffer in cache stores a list of all memory locations that have been modified since the last checkpoint by a given processor core. The list of modified memory locations may be used to improve system performance and reliability. The list of modified memory locations (stored in a 'circular buffer', 'HA log', or 'HA table') is maintained by supporting caches, e.g., L2/L3 caches, and modified cache lines hold HA data. The HA log and HA data are processed by a consumer core to provide system reliability and redundancy. HA producer caches have conventionally written an HA log to system memory. As HA data is victimized out from a cache associated with an HA producer core, the HA data has also conventionally been written to system memory.

To process the HA log and HA data, a consumer core has conventionally read both the HA log and the HA data from system memory. The conventional approach requires multiple accesses to system memory, incurs a relatively large bandwidth toll on memory resources, consumes power, and increases the time for the consumer core to processes the HA log and HA data, as compared to the techniques disclosed herein. In modern large servers, memory resource is at a premium and memory power is a major component of system power. According to the present disclosure, the time to process an HA log and HA data is reduced, which increases the time a system can devote to other tasks.

According to one or more embodiments of the present disclosure, a producer cache associated with an HA producer core moves an HA log (from a circular buffer in a producer cache) directly into a cache of an HA consumer core. According to various aspects, a producer cache also moves HA data stored in the producer cache directly into a cache of the consumer core. In this manner, the movement of HA log and HA data by a producer cache out to system memory followed by the consumer core having to fetch both the HA log and the HA data from the system memory is eliminated. As such, the required time for a consumer core to perform an HA system backup is reduced, the burden on memory resources is lowered, and power consumption associated with implementing HA is reduced.

In various embodiments, HA producer caches are configured to identify cache lines that should be put into the HA log. For HA log entries, an HA producer includes hardware registers to identify the location of the HA log. In one or more embodiments, an HA producer cache utilizes a system bus 'cache inject' command or 'forced cache inject' command to coherently install the HA log entry directly into a cache of an HA consumer core (instead of writing the HA log entry to system memory). The cache inject command is configured to maintain coherency since the producer core does not have ownership of the HA log cache line at the time of HA log writing. As is known, a cache inject command is a special system bus command that facilitates writing a cache line directly into a cache (e.g., a consumer cache). HA data can be distinguished from non-HA data based on an 'HA bit' in a directory of a producer cache that is used to track which cache lines were modified by an HA producer core.

When a producer cache victimizes HA data, a lateral cast-out (LCO) command can be used to coherently transfer the HA data to a cache (on a same level, e.g., L2-L2, L3-L3) of an HA consumer core rather than system memory. The LCO command allows a producer cache to specifically target a cache of a consumer core for all HA data. In one or more embodiments, an LCO command is used to transfer HA data as a producer core already has ownership of the HA data and the LCO is more efficient. The consumer core, when processing the HA log (via normal loads), will find the HA log cache line entries already in its own L2 and L3 caches, which minimizes the time required to access the HA log (the HA log points to HA data cache lines). When a consumer core initiates HA data processing, those HA data cache lines are found already installed coherently in consumer core caches (e.g., L2 and L3 caches of the consumer core). Moving HA logs and HA data directly from a producer cache to a consumer cache greatly reduces system bus traffic and latency associated with the consumer core processing HA log and HA data that is required to perform an HA backup of a system.

Figure 1:
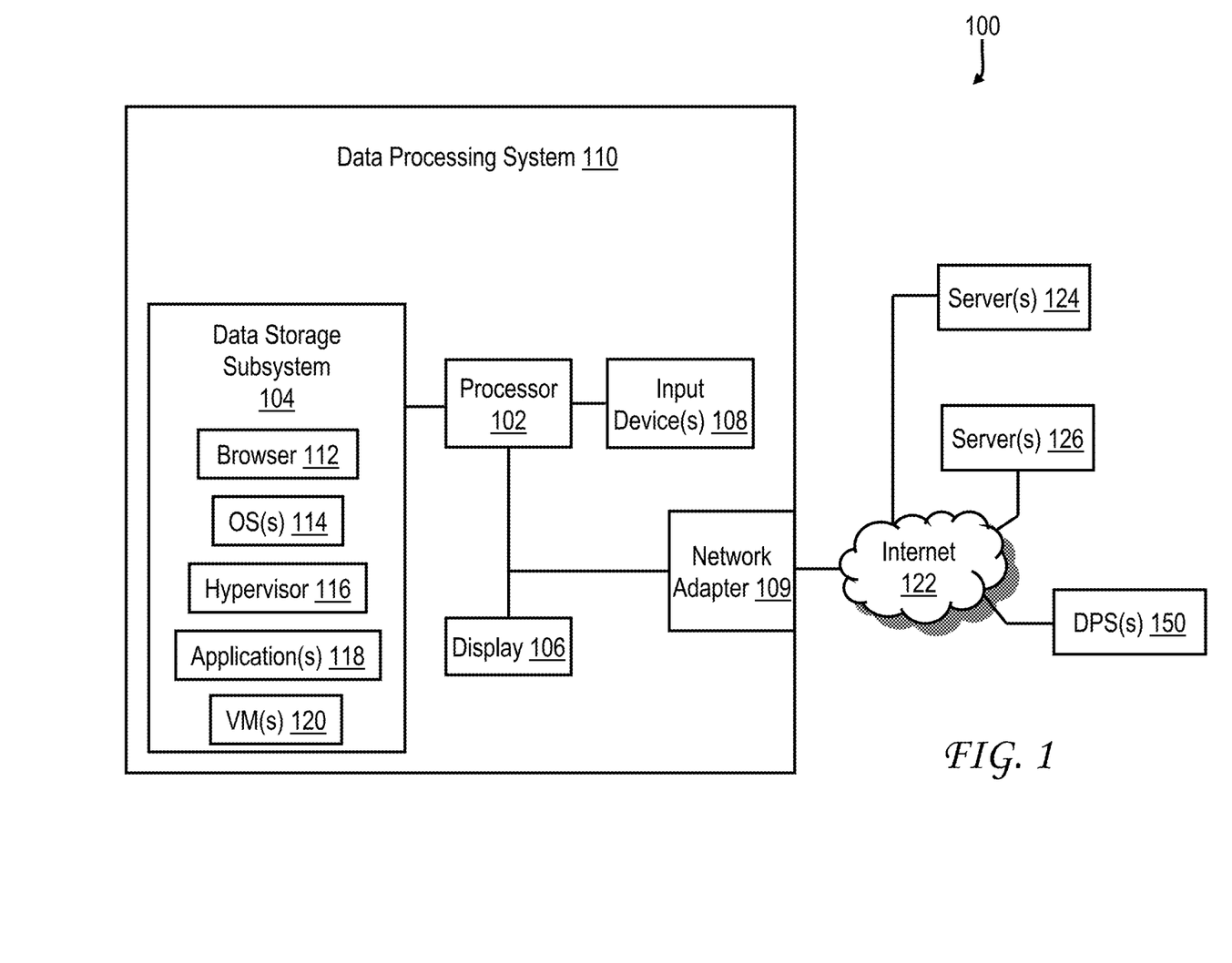
FIG. 1 is a diagram of a relevant portion of an exemplary data processing system environment that is configured to produce high-availability (HA) log and data according to the present disclosure.

With reference to FIG. 1, an exemplary data processing environment 100 is illustrated that includes a data processing system 110 that is configured, according to one or more embodiments of the present disclosure, to move HA logs and HA data directly from a producer cache to a consumer cache. Data processing system 110 may take various forms, such as workstations, laptop computer systems, notebook computer systems, desktop computer systems or servers and/or clusters thereof. Data processing system 110 includes one or more processing units or processors 102 (each of which may include one or more processor cores for executing program code) coupled to a data storage subsystem 104, optionally a display 106, one or more input devices 108, and a network adapter 109. Data storage subsystem 104 may include, for example, application appropriate amounts of various memories (e.g., dynamic random access memory (DRAM), static RAM (SRAM), and read-only memory (ROM)), and/or one or more mass storage devices, such as magnetic or optical disk drives.

Data storage subsystem 104 includes one or more operating systems (OSs) 114 for data processing system 110. Data storage subsystem 104 also includes application programs, such as a browser 112 (which may optionally include customized plug-ins to support various client applications), a hypervisor (or virtual machine monitor (VMM)) 116 for managing one or more virtual machines (VMs) 120 as instantiated by different OS images, and other applications (e.g., a word processing application, a presentation application, and an email application) 118.

Display 106 may be, for example, a cathode ray tube (CRT) or a liquid crystal display (LCD). Input device(s) 108 of data processing system 110 may include, for example, a mouse, a keyboard, haptic devices, and/or a touch screen. Network adapter 109 supports communication of data processing system 110 with one or more wired and/or wireless networks utilizing one or more communication protocols, such as 802.x, HTTP, simple mail transfer protocol (SMTP), etc. Data processing system 110 is shown coupled via one or more wired or wireless networks, such as the Internet 122, to various file servers 124 and various web page servers 126 that provide information of interest to the user of data processing system 110. Data processing environment 100 also includes one or more data processing systems (DPSs) 150 that are configured in a similar manner as data processing system 110.

In general, data processing systems 150 represent data processing systems that are remote to data processing system 110 and that may execute OS images that may be linked to one or more OS images executing on data processing system 110.

Those of ordinary skill in the art will appreciate that the hardware components and basic configuration depicted in FIG. 1 may vary. The illustrative components within data processing system 110 are not intended to be exhaustive, but rather are representative to highlight components that may be utilized to implement the present invention. For example, other devices/components may be used in addition to or in place of the hardware depicted. The depicted example is not meant to imply architectural or other limitations with respect to the presently described embodiments.

Figure 2:
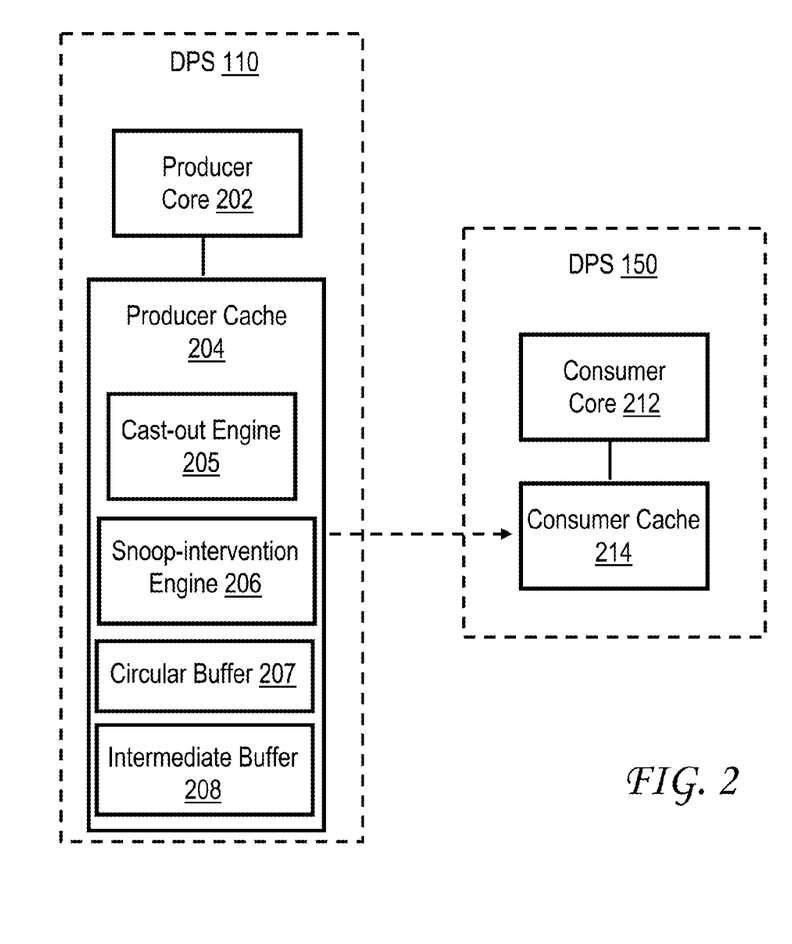
FIG. 2 is a diagram of a data processing system (that includes a producer core and a producer cache) and another data processing system (that includes a consumer core and a consumer cache) that may deployed in the data processing system environment of FIG. 1.

With reference to FIG. 2, relevant components of data processing systems (DPSs) 110 and 150 are illustrated in additional detail. DPSs 110 and 150 may include one or more processors 102 each of which include a level 1 (L1) cache that is coupled to one or more other cache levels (e.g., L2 and L3 caches) that may be, for example, implemented in data storage subsystem 104. As is illustrated in FIG. 2, DPS 110 includes a producer core 202 that is coupled to a producer cache (e.g., an L2 and/or an L3 cache) 204. As is illustrated, producer cache 204 may include a cast-out engine 205, a snoop-intervention engine 206, a circular buffer 207, and an intermediate buffer 208. Similarly, DPS 150 includes a consumer core 212 that is coupled to a consumer cache (e.g., an L2 and/or an L3 cache) 214. While producer core 202/producer cache 204 and consumer core 212/consumer cache 214 are illustrated as being in different data processing systems, it should be appreciated that producer core 202, producer cache 204, consumer core 212, and consumer cache 214 may be implemented within a same data processing system that includes multiple processor cores.

Figure 3:
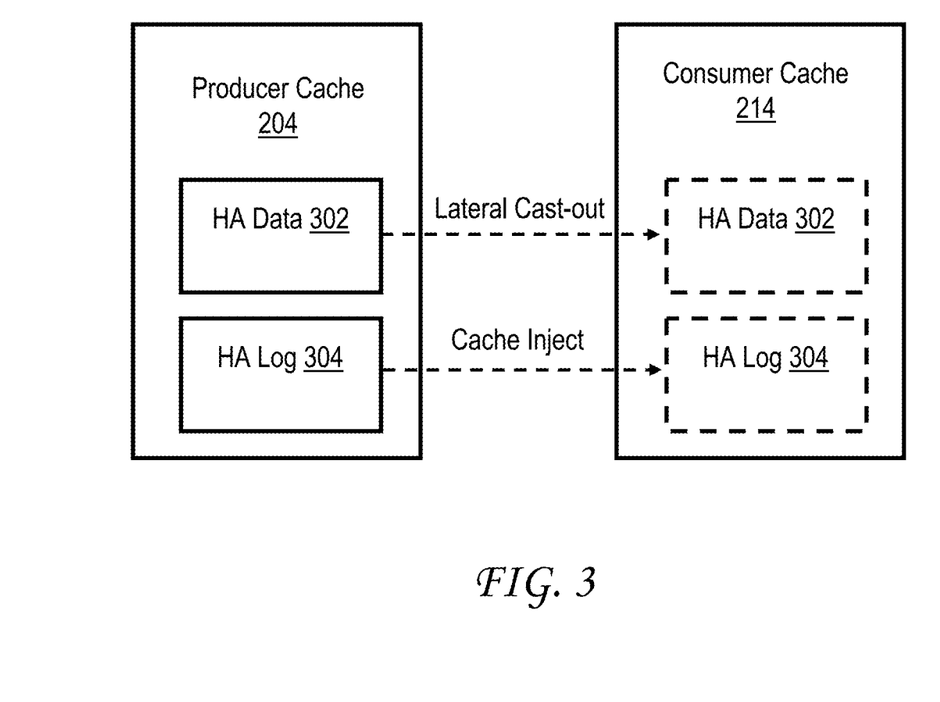
FIG. 3 is a diagram that depicts the transfer of HA log and data from the producer cache to the consumer cache of FIG. 2 (using a cache injection command and lateral cast-out command, respectively) according to an embodiment of the present disclosure.

With reference to FIG. 3, producer cache 204 is illustrated as storing HA data 302 and HA log 304 directly into consumer cache 214. HA data 302 and HA log 304 may be stored in a same cache level (e.g., L2 or L3) or may be stored in different cache levels. Consumer cache 214 is illustrated as storing HA data 302 responsive to a lateral cast-out (LCO) command from producer cache 204. Consumer cache 214 is also illustrated as storing HA log 304 responsive to a cache injection command from producer cache 204. It should be appreciated that HA data 302 and HA log 304 may be moved directly from producer cache 204 to consumer cache 214 using other types of operations. In general, the time required by consumer core 212 to process HA log 304 and HA data 302 is greatly reduced, as consumer core 212 does not have to retrieve HA log 304 and HA data 302 from system memory. As used herein, the term "system memory" refers to "main memory" and does not include "cache memory."

Figure 4:
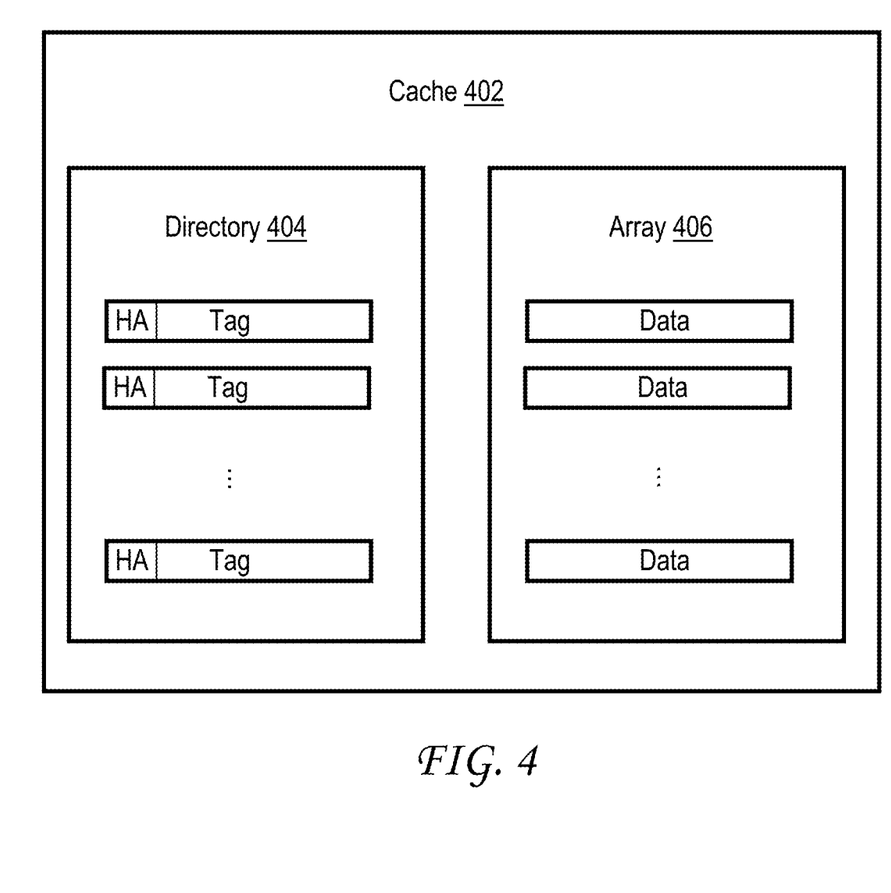
FIG. 4 is a diagram of a relevant portion of a cache whose directory includes an HA bit for each cache line to indicate whether a cache line requires transfer from a producer cache to a consumer cache according to another embodiment of the present disclosure.

With reference to FIG. 4, an exemplary cache 402 is depicted that includes a directory 404 (that includes a tag and an HA bit for each cache line) and an array 406 (that includes data). It should be appreciated that directory 404 may also include a number of flags (not shown) for each cache line. As mentioned above, the HA bit indicates whether a cache line requires transfer from producer cache 204 to consumer cache 214 for processing. The HA bit is asserted when data associated with a cache line is updated by producer core 202 (which is a processor core that is running in producer core mode). At a checkpoint, a cache walk operation (e.g., performed by, at least in part, cast-out engine 205) may traverse the entire producer cache 204 to examine the 'HA bit' for each cache line. A physical address for each cache line with an asserted HA bit is then written to HA log 304 (which may correspond to intermediate buffer 208). In one or more embodiments, when HA log 304 is full (or at some other threshold level, e.g., three-quarters full), producer cache 204 moves (e.g., responsive to a cache injection command issued by snoop intervention engine 206) HA log 304 to consumer cache 214 for later processing. In one or more embodiments, when HA data 302 is victimized (i.e., when a cache line is ejected from producer cache 204 to make room for additional data), producer cache 204 moves (e.g., responsive to issuance of a lateral cast-out command from cast-out engine 205) HA data 302 to consumer cache 214 for later processing. Alternatively, producer cache 204 may move (e.g., responsive to a lateral cast-out command) HA data 302 to consumer cache 214 prior to victimization. In any event, consumer core 212 utilizes HA log 304 to determine the location of HA data 302 when HA processing is initiated.

Figure 5:
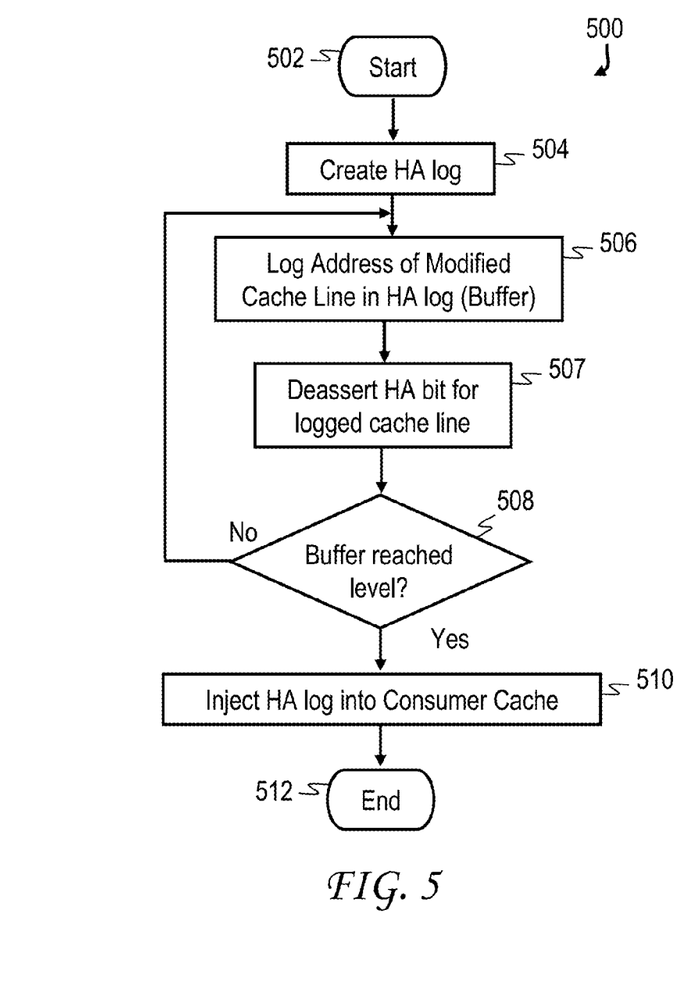
FIG. 5 is a flowchart of an exemplary process for creating and injecting an HA log into a consumer cache according to one embodiment of the present disclosure.

With reference to FIG. 5, a process 500 is illustrated that is initiated in block 502 each time, for example, an HA log 304 requires creation (e.g., in response to finding an HA line during a cache walk, a cache flush, an HA cache line victimization, and/or an HA cache line intervention) of a new entry. Next, in block 504, producer cache 204 creates an entry in HA log 304 in producer cache 204. Then, in block 506 producer cache 204 logs an address of a modified cache line in HA log 304 (e.g., in intermediate buffer 208 of producer cache 204). Next, in block 507 producer cache 204 deasserts an HA bit for the logged cache line. Then, in decision block 508, producer cache 204 determines whether HA log 304 has reached a predetermined fill level (e.g., seventy percent full, eighty percent full, full). In response to HA log 304 not being full in block 508, control transfers from block 508 to block 506. In response to HA log 304 being at the predetermined fill level in block 508, control transfers from block 508 to block 510, where producer cache 204 initiates (e.g., following transfer of the HA log from intermediate buffer 208 to circular buffer 207 of producer cache 204) cache injection of HA log 304 into consumer cache 214. In addition to initiating cache injection of HA log 304 into consumer cache 214 in block 510, another process 500 may be spawned to speed up checkpointing. Alternatively, another threshold may be utilized by producer cache 204 to determine when to inject HA log 304 into consumer cache 214. Following block 510, process 500 terminates in block 512 until a next HA log requires creation.

Figure 6:
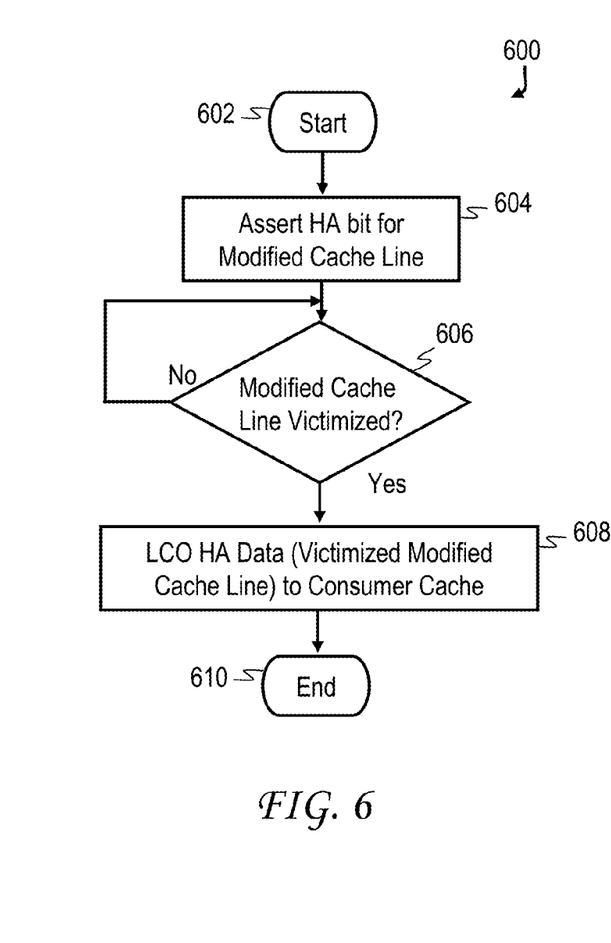
FIG. 6 is a flowchart of an exemplary process for designating HA data and injecting the designated HA data into a consumer cache according to one embodiment of the present disclosure.

With reference to FIG. 6, a process 600 is illustrated that is initiated in block 602 each time, for example, HA data 302 is created. Next, in block 604, producer cache 204 asserts an HA bit for a modified cache line to indicate that the cache line should be logged as HA data 302 in producer cache 204. Then, in decision block 606 producer cache 204 determines whether a cache line in HA data 302 is being victimized. In response to a cache line in HA data 302 not being victimized in block 606, control loops on block 606. In response to a cache line in HA data 302 being victimized in block 606, control transfers from block 606 to block 608, where producer cache 304 initiates movement of the modified cache line (i.e., HA data 302) into consumer cache 214. For example, the modified cache line may be moved from producer cache 204 to consumer cache 214 using a lateral cast-out (LCO) command. Alternatively, the modified cache line may be moved from producer cache 204 to consumer cache 214 prior to victimization of the modified cache line. Following block 608, process 600 terminates in block 610 until a next cache line is modified in producer cache 204.

Accordingly, techniques have been disclosed herein that move checkpoint-based high-availability (HA) log and data directly from a producer cache to a consumer cache.

In the flow charts above, the methods depicted in FIGS. 5 and 6 may be embodied in a computer-readable medium containing computer-readable code such that a series of steps are performed when the computer-readable code is executed on a computing device. In some implementations, certain steps of the methods may be combined, performed simultaneously or in a different order, or perhaps omitted, without deviating from the spirit and scope of the invention. Thus, while the method steps are described and illustrated in a particular sequence, use of a specific sequence of steps is not meant to imply any limitations on the invention. Changes may be made with regards to the sequence of steps without departing from the spirit or scope of the present invention. Use of a particular sequence is therefore, not to be taken in a limiting sense, and the scope of the present invention is defined only by the appended claims.

As will be appreciated by one skilled in the art, aspects of the present invention may be embodied as a system, method or computer program product. Accordingly, aspects of the present invention may take the form of an entirely hardware embodiment or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing, but does not include a computer-readable signal medium. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer-readable storage medium may be any tangible storage medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described herein with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be stored in a computer-readable storage medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

As will be further appreciated, the processes in embodiments of the present invention may be implemented using any combination of software, firmware or hardware. As a preparatory step to practicing the invention in software, the programming code (whether software or firmware) will typically be stored in one or more machine readable storage mediums such as fixed (hard) drives, diskettes, optical disks, magnetic tape, semiconductor memories such as ROMs, PROMs, etc., thereby making an article of manufacture in accordance with the invention. The article of manufacture containing the programming code is used by either executing the code directly from the storage device, by copying the code from the storage device into another storage device such as a hard disk, RAM, etc., or by transmitting the code for remote execution using transmission type media such as digital and analog communication links. The methods of the invention may be practiced by combining one or more machine-readable storage devices containing the code according to the present invention with appropriate processing hardware to execute the code contained therein. An apparatus for practicing the invention could be one or more processing devices and storage subsystems containing or having network access to program(s) coded in accordance with the invention.

Thus, it is important that while an illustrative embodiment of the present invention is described in the context of a fully functional computer (server) system with installed (or executed) software, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution.

While the invention has been described with reference to exemplary embodiments, it will be understood by those skilled in the art that various changes may be made and equivalents may be substituted for elements thereof without departing from the scope of the invention. In addition, many modifications may be made to adapt a particular system, device or component thereof to the teachings of the invention without departing from the essential scope thereof. Therefore, it is intended that the invention not be limited to the particular embodiments disclosed for carrying out this invention, but that the invention will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below, if any, are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiments were chosen and described in order to best explain the principles of the invention and the practical application, and to enable others of ordinary skill in the art to understand the invention for various embodiments with various modifications as are suited to the particular use contemplated.

What is claimed is:

1. A data processing system, comprising:
a producer core;
a producer cache coupled to the producer core;
a consumer core; and
a consumer cache coupled to the consumer core;
wherein the producer cache is configured to log addresses for cache lines modified by the producer core in a data array of the producer cache to create a high-availability (HA) log for the producer core, write the HA log directly into the consumer cache of the consumer core, and write HA data associated with the addresses of the HA log directly into the consumer cache, and wherein the HA log corresponds to a cache line that includes multiple of the addresses and the consumer core is configured to process the HA log and the HA data for the data processing system;

wherein the addresses for the modified cache lines are logged in an intermediate buffer of the producer cache; and wherein the HA log is transferred from the intermediate buffer to a circular buffer of the consumer cache in response to the intermediate buffer being full and is written into the consumer cache by injecting the HA log stored in the circular buffer into the consumer cache.

2. The data processing system of claim 1, wherein the modified cache lines are indicated by an HA bit.

3. The data processing system of claim 2, wherein the HA log and HA data are checkpoint-based high-availability (HA) log and data.

4. The data processing system of claim 2, wherein each cache line includes a HA bit that is set by a modification of the cache line when a processor core is running in producer core mode and which is cleared as part of a cache walk operation executed at a checkpoint, which causes cache lines for which the HA bit is asserted to log their addresses to the circular buffer, whereby use of the HA bit guarantees that all addresses are logged at a checkpoint interval without requiring a cache flush, wherein the processor further de-asserts the HA bit for all cache lines following the checkpoint.

5. The data processing system of claim 1, wherein the HA data associated with the addresses of the HA log is written directly into the consumer cache in response to the producer cache victimizing the HA data.

6. The data processing system of claim 5, wherein the producer cache utilizes a lateral cast-out (LCO) command to initiate coherent transfer of the HA data from the producer cache to the consumer cache.

7. The data processing system of claim 1, wherein the consumer cache is a level 2 (L2) cache or a level 3(L3) cache.

8. A processor, comprising:
a producer core; and
a producer cache coupled to the producer core, wherein the producer cache is configured to log addresses for cache lines modified by the producer core in a data array of the producer cache to create a high-availability (HA) log for the producer core, write the HA log directly into a consumer cache of a consumer core, and write HA data associated with the addresses of the HA log directly into the consumer cache, and wherein the HA log corresponds to a cache line that includes multiple of the addresses and the consumer core is configured to process the HA log and the HA data;
wherein the addresses for the cache lines modified by the producer core are logged in an intermediate buffer of the producer cache; and
wherein the HA log is transferred from the intermediate buffer to a circular buffer of the consumer cache in response to the intermediate buffer being full and written into the consumer cache by injecting the HA log stored in the circular buffer into the consumer cache, and wherein the HA data associated with the addresses of the HA log is written into the consumer cache in response to the producer cache victimizing the HA data.

9. The processor of claim 8, wherein the producer cache utilizes a lateral cast-out (LCO) command to initiate coherent transfer of the HA data from the producer cache to the consumer cache.

10. The processor of claim 8, wherein the consumer cache is a level 2(L2) cache or a level 3(L3) cache.

11. A processor comprising:
a producer core; and
a producer cache coupled to the producer core, wherein the producer cache is configured to log addresses for cache lines modified by the producer core in a data array of the producer cache to create a high-availability (HA) log for the producer core, write the HA log directly into a consumer cache of a consumer core, and write HA data associated with the addresses of the HA log directly into the consumer cache, and wherein the HA log corresponds to a cache line that includes multiple of the addresses and the consumer core is configured to process the HA log and the HA data
wherein the modified cache lines are indicated by an HA bit; and
wherein the processor further:
asserts the HA bit when data associated with a cache line is updated by a processor core running in producer core mode; and
executes a checkpoint, which triggers a cache walk operation to traverse the entire cache, wherein the cache walk operation examines the 'HA bit' and pushes the physical address out to the circular buffer.

12. The processor of claim 11, wherein the HA log and HA data are checkpoint-based high-availability (HA) log and data.

13. The processor of claim 11, wherein each cache line includes a HA bit that is set by a modification of the cache line when a processor core is running in producer core mode and which is cleared as part of a cache walk operation executed at a checkpoint, which causes cache lines for which the HA bit is asserted to log their addresses to the circular buffer, whereby use of the HA bit guarantees that all addresses are logged at a checkpoint interval without requiring a cache flush, wherein the processor further de-asserts the HA bit for all cache lines following the checkpoint.

14. The processor of claim 11, wherein the processor:
in response to a write performed when the processor is in producer core mode, sets the HA bit in the L2 cache for the associated cache line; and
in response with a cache line with the HA bit set in the L2 cache being cast-out to the L3 cache, sets the HA bit in the L3 cache associated with the cache line.

15. The processor of claim 11, wherein the processor:
traverses both the L2 and L3 caches during a cache walk operation at a next checkpoint;
writes all physical addresses for cache lines with the HA bit asserted to the circular buffer; and
clears all the HA bits once the cache walk operation is completed.

* * * * *